United States Patent [19]
Wiley

[11] 3,826,603
[45] July 30, 1974

[54] EXTRUSION DIE

[76] Inventor: Robert F. Wiley, 3 Oakwood Dr., Corning, N.Y. 14830

[22] Filed: Nov. 30, 1973

[21] Appl. No.: 420,660

Related U.S. Application Data

[62] Division of Ser. No. 280,508, Aug. 14, 1972.

[52] U.S. Cl.................. 425/461, 264/41, 425/376, 425/462
[51] Int. Cl............................................ B29d 7/22
[58] Field of Search .......... 425/131, 382, 461, 463, 425/464, 466, 67, 71, 72, 462; 264/176 F, 176 R, 177 F, 177 R, 209, 216

[56] References Cited
UNITED STATES PATENTS

| | | | |
|---|---|---|---|
| 2,748,401 | 6/1956 | Winstead | 264/209 X |
| 3,038,202 | 6/1962 | Harkenrider | 425/464 |
| 3,467,570 | 9/1969 | Baxter et al. | 264/177 R |

*Primary Examiner*—R. Spencer Annear
*Assistant Examiner*—Mark Rosenbaum
*Attorney, Agent, or Firm*—Charles W. Gregg; Clarence R. Patty, Jr.

[57] ABSTRACT

An extrusion die for forming ceramic material into core members or bodies for catalytic converters. A multiplicity of relatively minute passages are selectively etched through a plurality of similar relatively thin and flat plates or disks of a photosensitive glass or glass-ceramic material, the etched plates are stacked to form a laminated structure and are then fused into a substantially homogeneous or unitary die. The bottom plate of the laminated stack embodies a multiplicity of relatively minute and closely spaced apart columns each having a cross-sectional planar configuration which is substantially that of a rhombus with acute oblique angles of generally or on the order of about sixty degrees and with the relatively narrow passages between the columns extending continuously or coextensively but colinearly or in straight lines only a minimum distance in the direction across the plane of the bottom plate. The passages are etched into the bottom plate with only a very thin layer of the material of the plate left remaining adjacent to and beneath the bottom surface thereof for temporary support of the columns. The thin support layer is ground off of the bottom of the bottom plate to expose the passages and columns following the fusing of the plurality of plates into the homogeneous die, the columns then being supported by their having been previously fused to parts of the plate next above. The rhombus-shaped columns in the die provide for extrusion of cellular ceramic core members or bodies each having a multitude of passages extending longitudinally or axially therethrough parallel with each other and of minimum planar cross-sectional area with exposed wall surfaces each of a maximum areal extent for deposition of a catalytic agent thereon, such walls extending continuously but non-linearly in short straight-line directions normal to the longitudinal axes of the members or bodies so that some of the thermal expansion of the core members in such normal directions and upon subsequent heating of each member or body is contained or taken up within the member or body itself.

4 Claims, 6 Drawing Figures

PATENTED JUL 30 1974 3,826,603

EXTRUSION DIE

This is a division, of application Ser. No. 280,508, filed Aug. 14, 1972.

BACKGROUND OF THE INVENTION

Dies or die plates for the extrusion of ceramic material into cellular ceramic bodies having a multitude of extremely small and continuous passages extending axially therethrough parallel with the longitudinal center axis of the ceramic body have usually heretofore been made by machining a multiplicity of parallel extrusion passages or holes through cylindrical high-strength metal members in a direction parallel to the center axes of such members. Said machining of said passages or holes is extremely time consuming and, therefore, such metal dies are substantially expensive, and are especially so when said passages have cross-sectional configurations other than round and, therefore, are very difficult to machine through the metal members.

When the extruded ceramic bodies mentioned above are to be used, for purposes of emissions control, as core members or bodies for catalytic oxidation converters to be used in the exhaust systems of automotive vehicles having internal combustion engines, as disclosed in my copending patent application, Ser. No. 280,508, filed Aug. 14, 1972, it is expedient that said ceramic bodies be formed with the parallel passages extending axially therethrough having a maximum amount of exposed wall areas within a minimum cross-sectional area of the body. Such a configuration for said passages provides for ceramic bodies or core members for catalytic converters each of which such body of member has a minimum areal cross-section overall with a maximum amount of a catalytic oxidation agent deposited on said passage walls within said body or core member and exposed to exhaust gases flowing therethrough. Such core members or bodies provide for the making of catalytic converters having minimum cross-sectional dimensions in directions normal to the longitudinal center axis of the converters and, therefore, requiring a minimum amount of space in or beneath said automotive vehicles for mounting or inclusion of the converters in the exhaust systems of such vehicles for purposes of emissions control as previously mentioned.

While core members or bodies for catalytic converters and made of a ceramic material usually have relatively low coefficients of thermal expansion, such core members or bodies are relatively brittle and it is, therefore, expedient that the overall thermal expansion of such members be contained within the members or limited, to the extent possible, in order to prevent, to the extent possible, cracking or breaking up of the core members or bodies due to thermal expansion thereof. It is, therefore, an object of the present invention to provide a relatively low-cost die for extrusion of cellular ceramic core members or bodies for catalytic oxidation converters, such members or bodies having cylindrical overall shapes and each having a multiplicity of longitudinal passages extending therethrough parallel with the center axis of the respective member or body and normal to the planar end surfaces thereof, and the walls of said passages in said body or member being relatively closely spaced from each other in the planes thereof paralleling said end surfaces and the ceramic material in said planes, and whose sidewalls define the walls of said passages, have planar cross-sections of geometrically congruent planar figures of relatively minute areas and provide the greatest practicable total expanse of exposed wall areas with a minimum size of said minute areas.

It is another object of the present invention to provide a method for making said die.

Other objects of the invention will become apparent as the description proceeds.

SUMMARY OF THE INVENTION

A plurality of planar geometric figures each having a configuration of a triangle and arranged in an optimum manner with sides thereof closely paralleling each other in a repetitive pattern in a given area are believed to provide the minimum size of enclosed areas for a maximum total length of all the sides of any planar geometric configuration which could be chosen for said enclosed areas. However, such geometric figures or triangles cannot be arranged in said optimum manner without the spaces between the sides of said triangles continuously or coextensively extending in colinear or straight-line directions completely across said given area. A plurality of enclosed planar geometric figures each having a configuration of a rhombus with opposite sixty degree acute angles can, however, be optimumly arranged with sides thereof closely paralleling each other in a repetitive pattern across said given area without the spaces between the sides of said rhombuses extending in colinear or straight-line directions across said given area but with such spaces extending continuously or coextensively thereacross in a somewhat staggered fashion, rather than in the continuous straight-line or colinear fashion mentioned above. Accordingly the die of the present invention is made by the method briefly but believed to be sufficiently discussed in the foregoing Abstract of the Disclosure, such die embodying therein channels and passages for extrusion of cylindrical ceramic bodies each having a plurality of closely spaced apart passages extending axially therethrough and each such passage, in cross-sectional directions normal to the center axis of each of said cylindrical bodies, that is, in directions parallel with the planar end surfaces of the bodies, having a rhomboidal shaped planar configuration enclosing a relatively minute open area.

BRIEF DESCRIPTION OF THE DRAWINGS

In the drawings.

Similar reference characters refer to similar parts in each of the figures of the drawings.

PREFERRED EMBODIMENTS OF THE INVENTION

Figure 1:
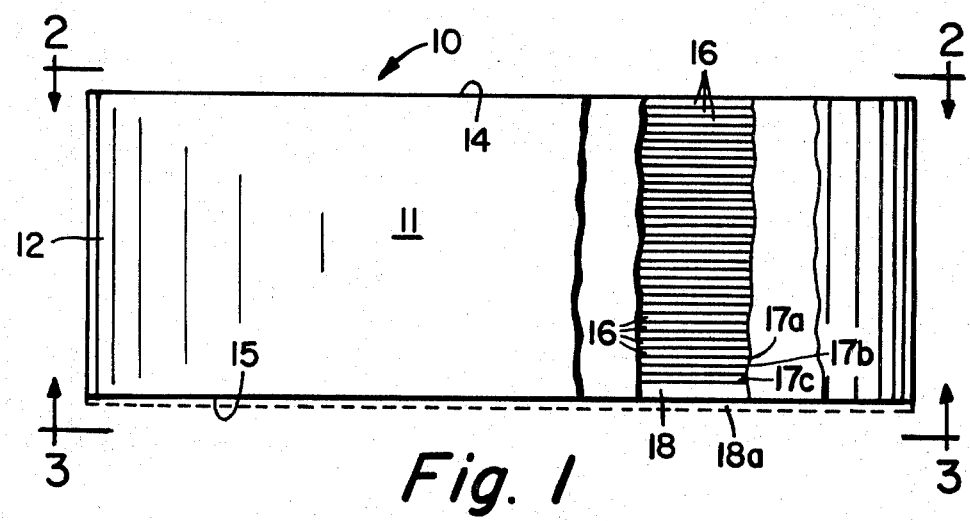
FIG. 1 is an elevational view of a cylindrical extrusion die embodying the invention, a region of such die being shown prior to fusion of parts thereof and for purposes of illustrating a step in the making of the die.
Figure 2:
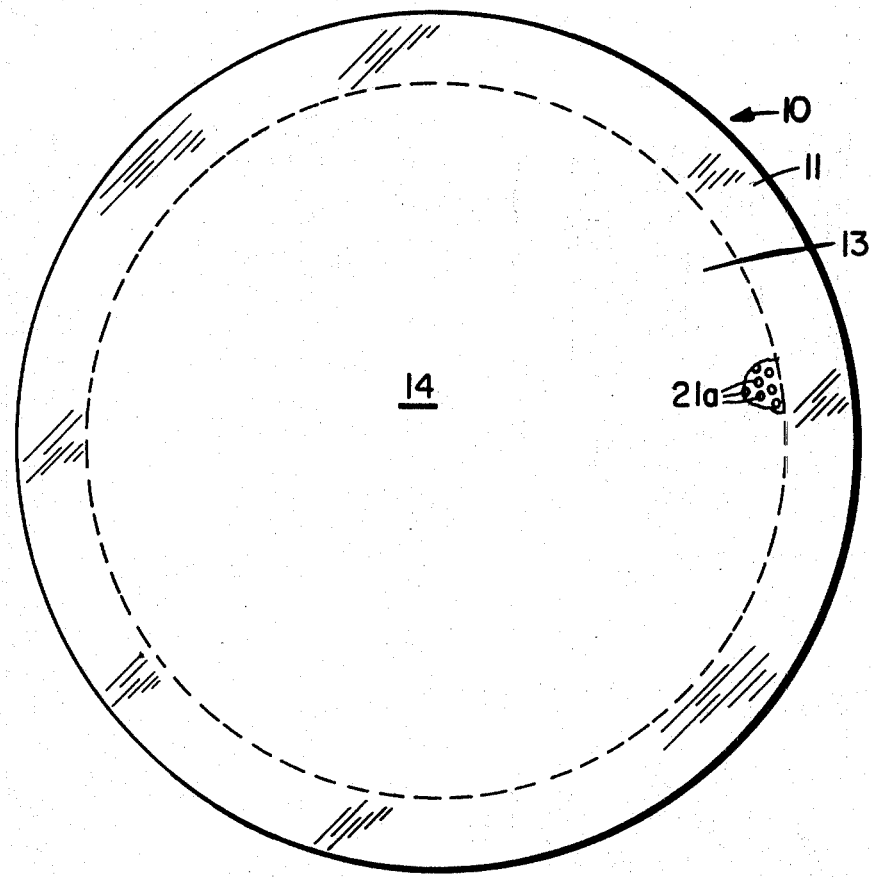
FIG. 2 is a top plan view of the die of FIG. 1, such view being taken generally along line 2—2 of FIG. 1 and generally illustrating as well as possible the configuration of a very small areal portion of the top surface of the die.
Figure 3:
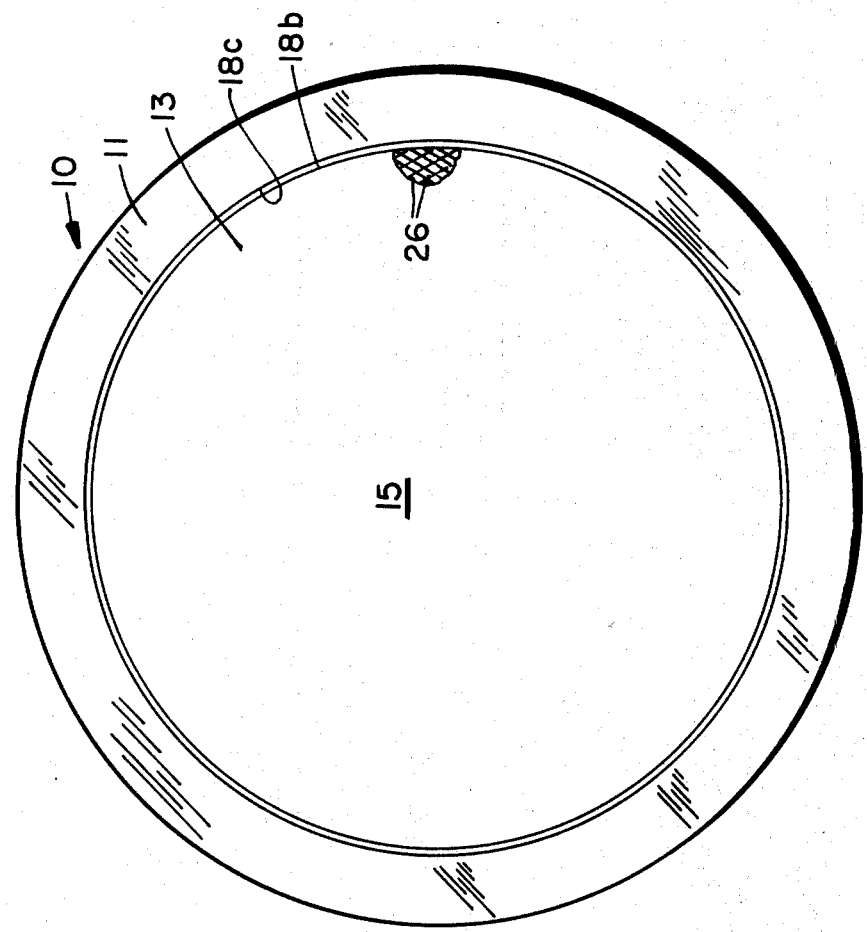
FIG. 3 is a view similar to that of FIG. 2 but comprising a bottom plan view of the die of FIG. 1, such view being taken generally along line 3—3 of FIG. 1, and generally illustrating as well as possible the configuration of a very small areal portion of the bottom surface of the die.

Referring to the drawings in detail, there is shown in FIG. 1 a cylindrical extrusion die 10 to be used for extruding or extrusion forming of a cermaic material into ceramic bodies to be used as core members or bodies for catalytic oxidation converters especially adaptable for use, for emission control purposes, in the exhaust systems of automotive vehicles having internal combustion engines. Such die comprises a homogeneous unitary cylindrical body having an outer perimetric circular wall region or portion 11 of a selected thickness, such as on the order of 0.500 inch, for example, (see also FIGS. 2 and 3) encompassing a cylindrical inner core portion or region 13 having a plurality of passages extending longitudinally through such core in a direction parallel with each other and with the common center axis of the core and of wall portion 11 as hereinafter further described. Die 10 includes, at opposite circular ends of the die, a ceramic material entrance-end or surface 14 extending in a first plane normal to said common center axis and a ceramic material exit-end 15 extending generally in a second plane normal to such common center axis.

Figure 6:
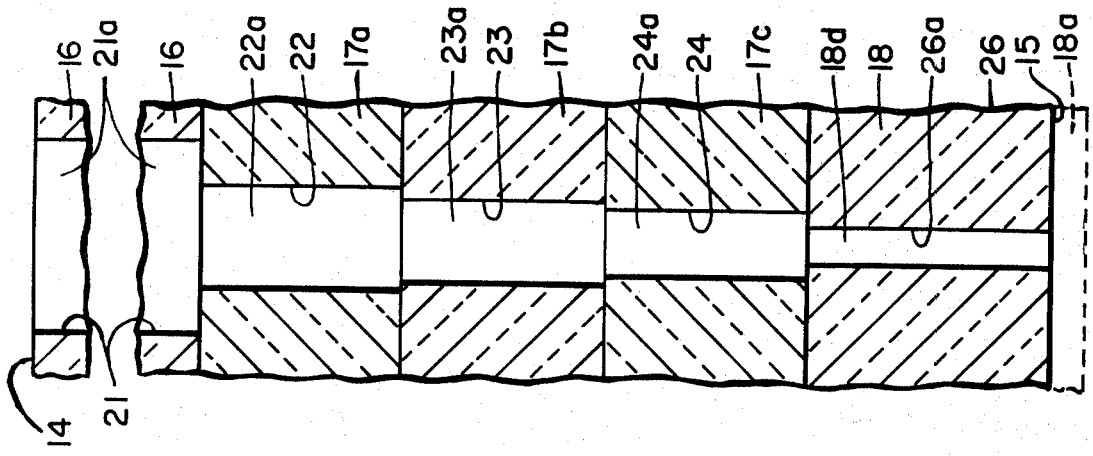
FIG. 6 is an enlarged cross-sectional detailed view of a part of a passage extending through the die of FIG. 1, such view being taken generally along line 6—6 of FIG. 4.

Referring further to FIG. 1, taken in conjunction with FIG. 6, die 10 is made from a multiplicity of relatively thin, flat and preferably circular disks or plates such as 16, 17a, 17b, 17c, and 18 having generally equal diameters and stacked in a planar face-to-face relationship as illustrated by the horizontal lines in FIG. 1. The plates such as 16 of the stack form one, or a part of or a first or upper cylindrical region of die 10 of a substantial thickness for purposes of strength, and with the upper or exposed surface of the top plate of said region of the stack providing the ceramic material entrance-end or surface 14 of the extrusion die. The plates 17a, 17b, and 17c of said stack form a second region, or another or second part of such first or upper cylindrical region, or a center cylindrical region, of die 10 of a substantially lesser thickness than that of said part of said first or upper region of the die. Plate 18 forms still another or a lower or second cylindrical region of die 10 with the exposed or lower surface of such plate providing the ceramic material exit-end or surface 15 of the extrusion die.

Said plates or disks are each preferably formed of a photo-sensitively opacifiable glassy material such as a glass or glass-ceramic material and the aforesaid passages extending through die 10 are provided therein by etching a multiplicity of orifices or holes completely or almost through each of said plates or disks, such orifices or holes extending therethrough from one planar surface of each respective plate or disk to the other. The holes through the disks or plates of each of the aforesaid regions of die 10 have different cross-sectional configurations as further discussed hereinafter. The glassy material of said plates or disks may, for example, comprise a glass composition such as disclosed, for example, in U.S. Pat. Nos. 2,684,911 or 2,971,853, issued July 27, 1954 and Feb. 14, 1961, respectively, to Stanley D. Stookey. In such case the passages or holes through the disks, such as 16, 17a, 17b, 17c, and 18, may, for example, be provided in such disks by either of the following described so-called "sculpturing" techniques. One surface of each said disk is masked with a photographic negative having clear areas defining the size and pattern of the desired holes in the respective disk. Such masked surface of the disk is then exposed to short-wave radiations, such as ultraviolet radiations, to cause the irradiated areas of said surface in said pattern of holes and the internal regions of the disk therebeneath to change so that they are capable of heat developed opacification. The disks are then subjected to a heating cycle to bring about said opacification of said areas and regions in said pattern of holes, and are then subjected to or treated with a suitable etchant such as a dilute aqueous solution of hydrofluoric acid which etches said holes through each respective disk in said desired pattern. Reference is made to U.S. Pat. No. 2,628,160, issued Feb. 10, 1953, to Stanley D. Stookey for further details of a method of providing said holes in said disks, if such details are desired.

The other method of providing said holes in said disks is similar to that described above except that, in the place of masking the surfaces of said disks with photographic negatives, a photoresist masking technique is used to provide the desired pattern of holes on the surfaces of the disks. Such photoresists and masking techniques are now well-known in the art and, therefore, no detailed discussion of the photoresist masking techniques is considered necessary.

A multiplicity of said plates or disks such as 16, 17a, 17b, 17c, and 18 are provided and each may, for example, have a diameter on the order of 6 inches with thicknesses of about 0.075 inch to 0.100 inch. Assuming that said plates such as 16, before fusing of the plates to form die 10, to each have a thickness of about 0.075 inch, a plurality of about 30 of such plates are selected, for example, and a multitude of similar circular holes, passages, or orifices such as 21a (FIG. 2) and each defined by a peripheral wall such as 21 (FIGS. 4, 5, and 6) are etched completely through a circular center area of each selected plate such as 16 so that they extend therethrough from one planar surface thereof to the other and in a direction normal to said surfaces, such holes or orifices being staggered across said surfaces in said center area so each has a center or center axis which is the same distance from the centers or center axis of each of the adjoining holes or orifices to thereby provide a maximum number of such holes in any selected area of said surfaces commensurate with strength of the etched plates. Such holes may, for example, each have a diameter on the order of 0.110 inch and the center spacing of said holes may, for example, be 0.150 inch. Said holes or orifices are preferably made through said disks or plates by the "sculpturing" techniques previously mentioned.

Figure 4:
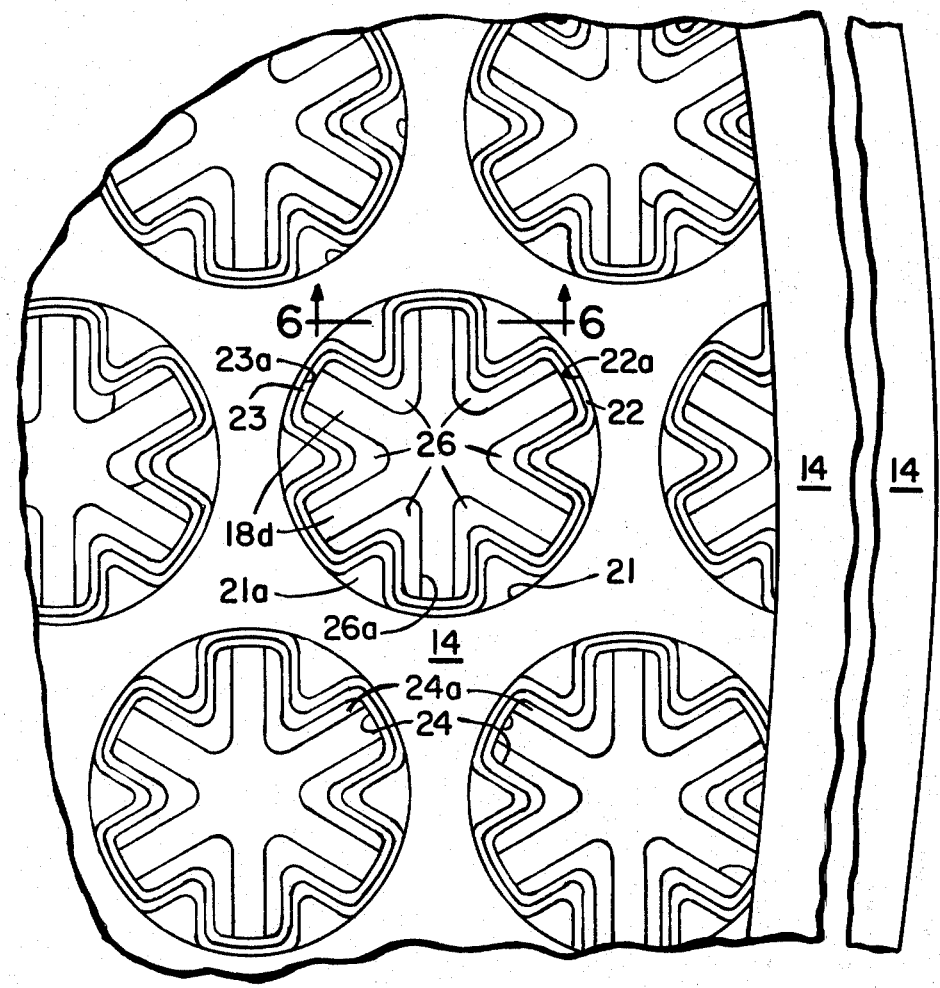
FIG. 4 is a detailed view, on a substantially enlarged scale, of said small top surface areal portion of the view of FIG. 2.
Figure 5:
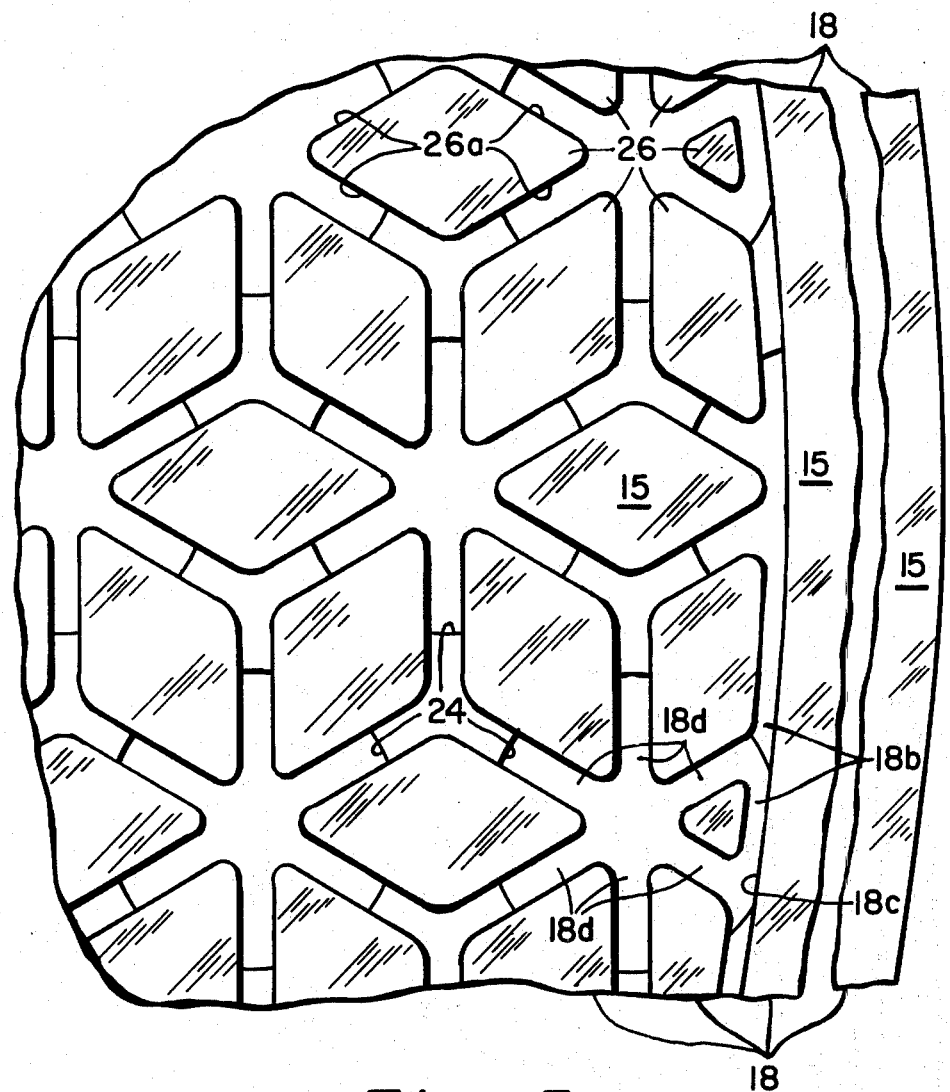
FIG. 5 is a detailed view, on a substantially enlarged scale, of said small bottom surface areal portion of the view of FIG. 3.

A second plurality or a succession of said multiplicity of plates or disks and comprising two, three, or more and, preferably three in number, and each having a thickness of about 0.075 inch are selected and there is etched through a circular center area of each plate of such succession a multiplicity of radiate passages, holes or orifices each having planar geometrically similar radiate configurations separated from each other and each having six radials with the center axes of such passages or orifices in each plate of said succession thereof being equally spaced from the center axes of each of the adjoining passages or orifices in such plate a distance substantially corresponding to the distance between said center axes of said circular passages or orifices etched through the plates or disks such as 16. As illustrated in FIGS. 1, 4, and 6, the plates or disks of said succession of three disks or plates comprise plates 17a, 17b, and 17c and said radiate holes or passages in the succeeding ones of such succession of plates or disks are defined by walls such as 22, 23, and 24, respectively, and are designated 22a, 23a, and 24a, respectively. The radiate orifices or passages in each succeeding one of said succession of plates are geometrically similar, in the direction of the planes of said planar surfaces of the plates, to such passages in any immediately preceding one of the succession of plates but have smaller dimensions in the direction of said planes. In other words, the radiate orifices or passages such as 24a in plate 17c are geometrically similar in areal cross-section to the passages such as 23a and 22a in plates 17b and 17a, respectively, and, therefore, the radiate orifices or passages such as 23a in plate 17b are also geometrically similar in areal cross-section to the passages such as 22a in plate 17a. However, the dimensions of the radiate orifices or passages such as 24a in plate 17c are smaller than those of the passages or orifices such as 23a in plate 17b, and the dimensions of the radiate orifices or passages in plate 17b are smaller than those of the radiate orifices or passages such as 22a in plate 17a. The etching of the orifices, holes or passages through the plates or disks such as 17a, 17b, and 17c are preferably etched therethrough in the same manner as said holes, orifices or passages such as 21a are etched through the plates or disks such as 16.

A single one of said multiplicity of plates or disks 18 (FIGS. 1, 5, and 6) and preferably having a thickness of about 0.100 inch for purposes of strength, but which, as previously mentioned, may have a thickness of about 0.075 inch to 0.100 inch, is selected and a plurality of relatively narrow channels are selectively etched substantially or almost through such one plate, in the direction normal to the planar end surfaces thereof and from one of such surfaces towards the other, while leaving adjacent to and beneath such other end surface a continuous, substantially thin and planar support layer 18a of the plate material (FIGS. 1 and 6) which layer may, for example, have a thickness on the order of about 0.010 inch. Such channels extend in planes parallel with said end surfaces of plate 18 and include a relatively narrow circular channel 18b defined by part of the sidewalls 26a of rhombus shaped columns such as 26 hereinafter discussed and a circular outer wall 18c (FIGS. 3 through 6) such channel being concentric and extending parallel with the outer perimeter of the plate 18 and spaced therefrom a selected distance, such as on the order of 0.500 inch as previously mentioned, and a repetitive pattern of relatively narrow and short straight-line interconnecting and non-linearly continuous or coextensive channels such as 18d (FIGS. 4, 5, and 6) some of which connect with said circular channel 18c and groups of six of which channels intersect each other at substantially equal angles on the order of about sixty degrees and provide a common center axis of intersection of the centerlines of the six channels of each said group of six channels with each such center axis being spaced substantially the same distance from the corresponding center axis of each of the similar adjoining groups of six channels, such distance substantially corresponding to the distance between said center axis of the passages or orifices etched through the plates or disks such as 16 and 17.

The walls defining the aforesaid pattern of channels such as 18d are defined by the sidewalls of a multitude of the previously mentioned closely and corresponding spaced apart columns such as 26 (FIGS. 3, 4, 5, and 6) having, where possible, corresponding planar cross-sectional geometric configurations generally those of rhombuses with acute oblique angles on the order of about sixty degrees, such columns 26 having sidewalls such as 26a (FIGS. 4, 5, and 6) which are also the previously mentioned sidewalls defining the walls of the channels such as 18d and the inner limits of previously mentioned circular channel 18b. It is apparent, from a brief glance at FIG. 5, that the columns such as 26 cannot have planar cross-sectional geometric configurations of rhombuses when the sidewalls of such columns border on channel 18b and define the inner limits, that is, from the inner wall of such circular channel. Therefore, it is stated above that the columns have the stated cross-sectional configurations only where possible. Said circular channel 18b and said intersecting channels such as 18d may each, for example, have a width on the order of about 0.010 inch. Said center axes of the points of intersection of each of the previously mentioned groups of six channels such as 18d are about 0.150 inch from the corresponding center axes of the points of intersection of each of the adjoining groups of six channels such as 18d since, as previously mentioned, the distance between said center axes corresponds to the distance between said center axes of adjoining ones of said passages, orifices or holes provided in each of the plates such as 16 and 17.

A stack of all of said etched plates is made with the planar surfaces of adjoining ones thereof abutting and with said center axes of the passages and channels etched therein axially aligned with each other. Such stack includes said succession of plates such as 17a, 17b, and 17c in its successive or consecutive order with the plate 17a having the largest dimensional passages therethrough at a first or upper end of such succession and the plate 17c having the smallest dimensional passages therethrough at the second or lower end of the succession as shown in FIG. 1 but best illustrated in FIG. 6. Said stack also includes said plurality of plates such as 16 with the planar surface of one of the end plates of such plurality remaining exposed and the planar surface of the other end plate of such plurality abutting against the planar surface of said plate 17a at said first or upper end of said succession of plates. Said plurality and said succession of plates form one or a first region, or parts of a first region, of a completed die such as 10 following fusing of said plates to each other as hereinafter discussed. Said stack of plates further includes said one plate 18 with said etched planar surface thereof abutting against the planar surface of said plate 17c at the second or lower end of said succession of plates and said other planar surface of plate 18 remaining exposed. Said one plate provides another or second region of a completed die such as 10.

Following the stacking of said plates 16, 17a, 17b, 17c, and 18 as described above, such stack of plates is treated to fuse such plates to each other and thereby form a generally homogeneous or unitary body. When, for example, said plates are made of a glass composition such as disclosed in the aforecited U.S. Pat. Nos. 2,684,911 or 2,971,853, said plates or said stack of plates, before or after stacking thereof, are exposed to shortwave radiations such as rays of ultraviolet light and, thereafter, the stack of plates is subjected to a heat and pressure cycle to fuse the plates of such stack to each other and thereby form a unitary or generally homogeneous body. Following said fusion of the stack of plates to each other, the fused stack or homogeneous body so formed is permitted to cool and the following described step completes the making of the die such as 10.

Referring to FIGS. 1 and 6, the previously mentioned layer 18a of disk or plate 18, that is to say, the layer 18a, which was previously part of plate 18 but which may now be considered to be part of the above-mentioned fused, or unitary or homogeneous body or stack of plates, is removed to expose the lower or previously non-exposed ends of the previously mentioned columns such as 26 having planar cross-section configurations of rhombuses as also previously mentioned, and to expose the channels such as 18b and 18d between the columns such as 26. Such removal of said layer 18a is preferably performed by grinding or similar abrading of such layer down to the level of the previously mentioned planar surface 15 (FIGS. 1, 5, and 6) so that said channels and columns are exposed as mentioned. Said columns such as 26 are, previous to the fusion of the upper surface of plate 18 to the lower surface of plate 17c, that is to say, previous to the fusion of the abutting surfaces of plates 18 and 17c, supported only by layer 18a as also previously pointed out. However, following said fusion, said columns such as 26 are also supported by said plate 17c, which is then, of course, an homogeneous part of the fused body and, therefore, said layer 18a (now also an homogeneous part of the fused body) can be removed, as discussed above, to complete die 10, and the columns 26 of such die are then supported by their being an homogeneous part of such die, as is believed readily apparent.

It is believed expedient to point out that an extrusion die such as 10, having columns such as 26 and channels such as 26a therebetween, could conceivably be made out of a body of metallic material by intricate machining of such a body. However, as will be readily apparent to those skilled in the art, such an extrusion die would be extremely expensive because of difficulties, and exceptional skills and care, required in the making of such a die. Furthermore, an extrusion die such as 10 can have a cylindrical shape other than circularly cylindrical, that is, the die can have a planar geometric cross-sectional configuration of an oval, elipse, square, rectangle etc. if, for some reason, a die having one of such shapes is considered desirable.

Although there is herein disclosed, to any detailed extent, only one type of a die embodying the invention and only one method of making such a die, it will be understood that various changes may be made therein within the purview of the appended claims without departing from the spirit and scope of the invention.

I claim:

1. An extrusion die for the extrusion forming of a plastic ceramic material into a cellular member or body to be used as a core member or body for a catalytic oxidation converter, such die comprising a cylindrical unitary body including;
    A. a first cylindrical region having extending therethrough from a planar and material-entrance end surface thereof to the plane of a material-exit end of such region a multiplicity of closely and correspondingly spaced-apart and similar inlet and feed passages for the material to be extruded through the die, the longitudinal center axes of said passages each being spaced the same selected distance from the center axis of each adjoining passage;
    B. a second cylindrical region having extending therethrough from the plane of a first and material-entrance end thereof to a planar and material-exit end surface of such region a repetitive pattern of relatively narrow and short straightline interconnecting and nonlinearly continuous or coextensive channels groups of six of which channels intersect each other at substantially equal angles on the order of about 60° and provide a common center axis of intersection of the center lines of the six channels of each group of six channels with each such center axis being spaced substantially the same distance from the corresponding center axis of each of the similar adjoining groups of six channels, such distance corresponding to said selected distance between the center axes of said passages in said first region of said cylindrical unitary body, the walls of said pattern of channels being defined by the sidewalls of a multitude of closely and correspondingly spaced-apart columns having corresponding planar cross-sectional configurations generally those of rhombuses with acute oblique angles on the order of about 60°, said plane of said first and material entrance-end of said second cylindrical region of said unitary die body meeting said plane of the material-exit end of said first cylindrical region of the die body with the center axes of said passages and of said groups of six channels coaxially aligned.

2. A die body in accordance with claim 1 and in which such body is made of a photosensitively opacifiable glassy material and said passages and channels in said first and second regions thereof are formed therein by selective etching.

3. A die body in accordance with claim 1 and in which such body comprises a stacked multiplicity of relatively thin plates of a glassy material having planar geometrically congruent shapes and fused to each other in a face-to-face relationship to provide a fused laminated body of said plates.

4. A die body in accordance with claim 3 and in which said passages and channels in said regions of said body are etched through the individual ones of said multiplicity of relatively thin plates prior to said stacking and fusing thereof.

* * * * *